Aug. 26, 1969     J. MORKOSKI     3,463,242
TOOTHED BAR STRUCTURE FOR PEG TOOTH HARROW
Original Filed Dec. 2, 1964
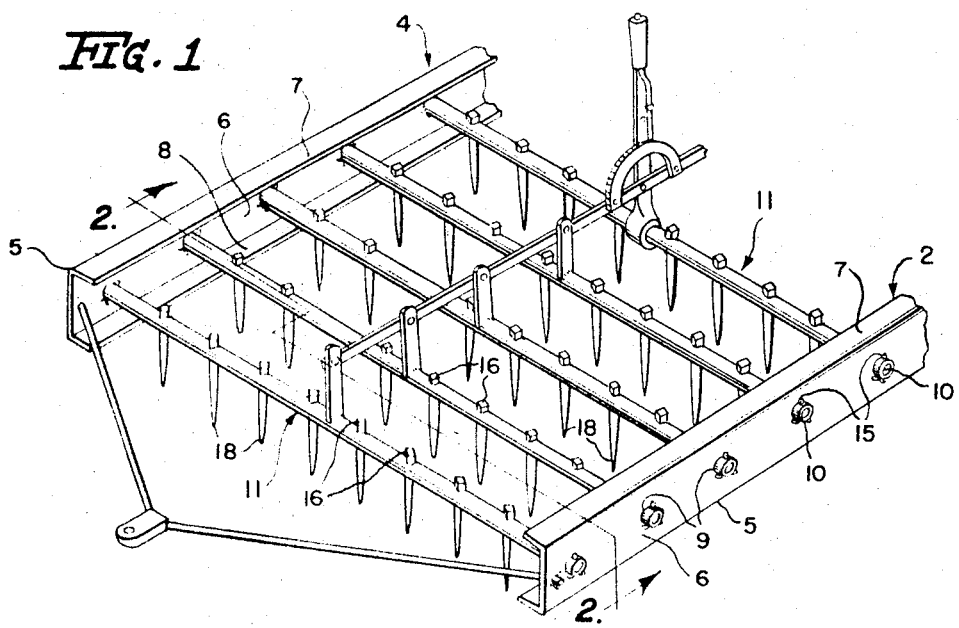
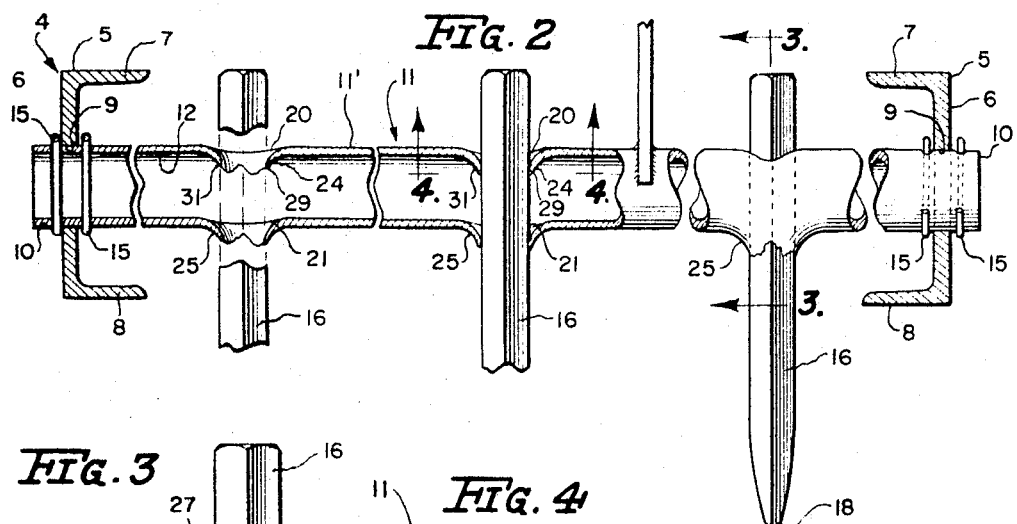
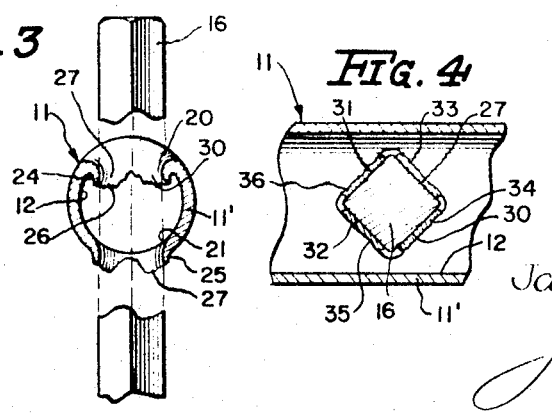
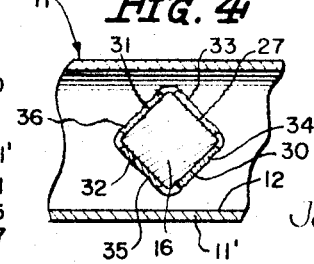
INVENTOR.
James Morkoski
John J. Kowalik
Atty.

United States Patent Office 3,463,242
Patented Aug. 26, 1969

3,463,242
TOOTHED BAR STRUCTURE FOR PEG TOOTH HARROW
James Morkoski, Clarendon Hills, Ill., assignor to International Harvester Company, a corporation of Delaware
Original application Dec. 2, 1964, Ser. No. 415,539, now Patent No. 3,325,879, dated June 20, 1967. Divided and this application Sept. 2, 1966, Ser. No. 630,145
Int. Cl. A01b 23/02, 15/02, 15/12
U.S. Cl. 172—713       3 Claims

ABSTRACT OF THE DISCLOSURE

A toothed bar for a peg tooth harrow comprising a tubular bar with transversely aligned openings defined by flanges ruptured from the wall of the bar, each flange tapering downwardly and being of generally frusto-conical form and sphincterally embarcing a tooth extending therethrough.

---

This invention relates to agricultural apparatus and more specifically to a peg tooth harrow and to a method of making the same, and is a division of my application Ser. No. 415,539, filed Dec. 2, 1964, and now Patent No. 3,325,879.

One of the problems inherent in current peg tooth harrow constructions is in the fastening of the teeth of the harrow to the supporting bar structure. These connections in general are either bolted or welded types. The bolted connections entail extensive manual handling in assembling and in the manufacturing of the respective parts whereby the costs are exceedingly prohibitive. In the welding attachment the range of metals or compositions to be used is limited so as to obtain good weldments and furthermore the welding requires a highly skilled operator to insure a good weld between the hard teeth and the more malleable support bar. The welding, of course, causes structural deterioration of the parts because of the heating necessary to effect the welding.

A general object of the invention is to provide a novel securement of simple and effective strength between the support bar and the respective teeth.

A further object of the invention is to provide a novel securement between a tooth bar and the teeth which comprises punching the teeth through the support bar in such manner as to rupture the metal of the support bar to effect a tight wedging engagement therebetween without the necessity of welding or any other securement.

A still further object of the invention is to provide an improved harrow wherein the support bar is in the nature of a cylindrical tube, the tube itself serving as a pivot to the frame of the harrow.

A still further object of the invention is to provide a novel method of securing a harrow tooth to the support bar which comprises using the sharpened or pointed tooth as a punch for penetrating the bar whereby rupturing the metal of the bar and by the wedging effect obtained establishing effective securement therebetween.

These and other objects and advantages inherent in and encompassed by the invention will become more readily apparent from the specification and the drawings wherein:

FIGURE 1 is a fragmentary perspective view of a harrow incorporating the invention;

FIGURE 2 is an enlarged longitudinal sectional view of a portion of a tooth bar incorporating the invention the view being taken substantially on line 2—2 of FIGURE 1;

FIGURE 3 is a cross-sectional view of the bar at the tooth connection taken substantially on line 3—3 of FIGURE 2; and FIGURE 4 is a horizontal section taken substantially on line 3—3 of FIGURE 2.

Describing the invention in detail there is shown a peg tooth harrow generally designated 2 which comprises a framework generally indicated as 4 which includes a pair of channel shaped longitudinally extending side rails 5, 5.

Each side rail 5 comprises a vertical web 6 and top and bottom flanges 7 and 8. The vertical web 6 is apertured at selective intervals longitudinally thereof to provide pivot openings 9. Corresponding openings 9 in the side rail members 5 receive therethrough opposite end portion 10 of a pivot and tooth support bar generally designated 11. The bar 11 is a tubular structure or cylindrical tube having a wall 11' and an internal bore 12. Each bar 11 is secured at each end to the associated side beam member 5 by means of cotter keys or other securing means 15, 15 which are passed through suitable apertures in the bar at opposite sides of the respective wall 6. Thus, the bar is restricted against axial or endwise movement with respect to the frame members 5, 5. The wall thickness may be of any desired dimension and the composition of material may be as desired provided it is softer than the tooth 16 and permits penetration by the tooth.

One of the features of the present invention is in the securement of the rake teeth or pegs 16 to the respective bars 11. This securement is effected by placing the bar or tube in a suitable guide or support and driving the teeth 16 therethrough as by a punch press, which, if desired may be automatic. In other words the bar may be moved and the teeth driven through the bar in an automated press.

It will be seen that the teeth 16 are generally diamond-shaped or square in cross-section and have a lower pointed end 18 which is adapted to pierce the bar, the tooth being driven through the tube 11 with such force as to cause the bar to become ruptured to provide openings 20, 21 in diametrically opposite sides of the bar, namely the upper and lower sides. It will be observed that in the punching operation, the metal which normally bridges the openings 20 and 21 is caused to elongate until it ruptures whereupon it provides a downwardly coned wedge locking structure or securing means 24 in the upper portion of the tube, said locking means 24 entering into the bore 12 of the tube. The penetration of the tooth 16 also develops the aperture 21 and elongates the metal of this area into a downwardly coned wedge locking structure 25. It will be understood that this punching operation is performed on cold metal, that is, both the tooth 16 and the tube 11 are cold when the punching operation is performed. Of course, it will be appreciated as the metal upon being punched is stretched in rupturing there is a momentary heating of the apertured areas with consequent at least some expansion of the opening and also reduction of the coefficient of friction. Immediately thereafter the metal cools and contracts and that together with the tension developed in the metal since it is not free flowing provides a spincterlike clamping action by the conical portions 24 and 25 against the tooth 16. Furthermore, it will be realized that the lower edges 26 and 27 are jagged and they have a tendency to gall into the sides of the penetrating tooth 16.

In addition to the cone interlock there is a structural interlock because of the shape of the tooth which is substantially diamond-shaped in cross-section having sides 29, 30, 31 and 32. Thus, the frusto-conical or pyramidal shapes of the portions 24 and 25 have portions 33, 34, 35 and 36 which complement and oppose the respective sides 29 through 32. Thus, the tooth is interlocked against relative rotation about its longitudinal axis with respect to the tooth bar. Furthermore, the cross-section of the wedge portions 22, 25 contours the metal so as to provide rigidity in the direction circumferentially of the axis of the bar 11 that is along transaxial planes and in use longitudinally of the tooth, that is generally vertically.

The foregoing structures have been actually made and in such structures it has been determined that loads in excess of 2100 lbs. have been exerted on the tooth to withdraw it from the support bar by pulling on the upper end and 1500 lbs. were required to push the tooth on the blunt end to effect separation and withdrawal from the tooth from the bar.

As an example to the structure axially made the bar 11 was a round light wall structural pipe 1¼" in diameter with a wall thickness of 20% lighter than standard, that is 110 inches. Standard 1¼" pipe is defined as ASTM-A-120-62T schedule 40. The peg tooth is preferably of steel identified as 7-1044.

It will be realized that a novel method has been developed for attaching the peg teeth to the tooth bar which comprises providing a tubular tooth bar or one with spaced transversely aligned portions and then driving a tooth through the metal of these portions to rupture the portions and to effect a mechanical interlock between these portions and the tooth. In addition to the physical distortion of the tooth bar in order to improve the interlock the metal, which is of a steel or ferrous metal, is caused to age and to rust particularly in the areas of the interlock and thus the rusting of the parts tends to form a mechanical bond and to increase the coefficient of friction between the parts to further add to the interlock at the joints. A die D, shown in phantom, may be provided to control flow of the flanges of the lower interlock 25.

It will be further apparent that the cold punching by the use of the teeth themselves effects a contour of the metal around the respective openings such that the tooth bar in such areas is actually rigidified. The flanges 33 through 36 as well as the similar flanges on the lower portion 25 produce a vertical columnar effect whereby the bar is not weakened in these areas such as would normally promote early fatigue failures with jagged openings.

What is claimed is:
1. The combination of a support bar having a tubular wall section with transversely aligned openings therein, a tooth extending transversely of the bar through said openings, and integral flange means on said wall section about each opening having a sphincteral engagement with the tooth and wherein said flange means extends axially of the tooth, the flange means about one opening projecting internally of the tube and the flange means about the other opening projecting externally of the tube, said flange means being generally frusto-conical and tapering downwardly toward the tooth.

2. The invention according to claim 1 and said flange means comprising a plurality of jagged points penetrating into the sides of said tooth.

3. The invention according to claim 1 and said tooth being polysided and said flange means complementally conforming to the shape of the tooth.

References Cited
UNITED STATES PATENTS

| | | | |
|---|---|---|---|
| 265,084 | 9/1882 | Howard | 172—713 |
| 522,086 | 6/1894 | Porteous | 172—713 |
| 910,541 | 1/1909 | Horner | 172—635 |
| 1,093,914 | 4/1914 | Close | 29—160 |
| 3,043,377 | 7/1962 | Urben | 172—635 X |

ROBERT E. BAGWILL, Primary Examiner

ALAN E. KOPECKI, Assistant Examiner

U.S. Cl. X.R.

287—1; 306—1.5